United States Patent [19]
Ueda et al.

[11] Patent Number: 4,863,812
[45] Date of Patent: Sep. 5, 1989

[54] BATTERY RECEPTACLE

[75] Inventors: Toshiaki Ueda; Katsuhiko Nomura; Yukio Takaoka, all of Tokyo, Japan

[73] Assignee: Asahi Kogaku Kogyo K.K., Tokyo, Japan

[21] Appl. No.: 117,150

[22] PCT Filed: May 26, 1987

[86] PCT No.: PCT/JP87/00332
§ 371 Date: Sep. 28, 1987
§ 102(e) Date: Sep. 28, 1987

[87] PCT Pub. No.: WO87/07435
PCT Pub. Date: Dec. 3, 1987

[30] Foreign Application Priority Data

May 29, 1986 [JP] Japan .................................. 61-81771
Oct. 20, 1986 [JP] Japan ................................ 61-160326

[51] Int. Cl.⁴ ...................... H01M 2/10; H01M 12/00
[52] U.S. Cl. .......................................... 429/9; 429/97; 429/9.9; 429/100
[58] Field of Search ............................ 429/9, 96–100; 220/20.5, 21

[56] References Cited

U.S. PATENT DOCUMENTS

| 946,905 | 1/1910 | Magna ..................... 429/99 |
| 998,895 | 7/1911 | Harvey ................... 429/97 X |
| 3,341,053 | 9/1967 | Keene ................... 429/97 X |
| 3,392,443 | 7/1968 | Kawano et al. . |
| 4,020,245 | 4/1977 | Mabuchi et al. . |
| 4,205,121 | 5/1980 | Naitoh . |
| 4,382,220 | 5/1983 | Marshall et al. . |
| 4,468,439 | 8/1984 | Ohara et al. . |
| 4,603,791 | 8/1986 | Splerer et al. ............ 220/20.5 |
| 4,645,325 | 2/1987 | Inoue et al. . |
| 4,690,878 | 9/1987 | Nakamura ................ 429/97 X |

FOREIGN PATENT DOCUMENTS

| 1471796 | 1/1969 | Fed. Rep. of Germany . |
| 2549356 | 8/1976 | Fed. Rep. of Germany . |
| 58-44667 | 3/1983 | Japan . |
| 58-97259 | 6/1983 | Japan . |
| 61-13839 | 1/1986 | Japan . |
| 0456699 | 7/1968 | Switzerland . |

Primary Examiner—Stephen J. Kalafut
Attorney, Agent, or Firm—Sandler & Greenblum

[57] ABSTRACT

A battery receptacle is provided for selectively and alternately receiving a lithium battery (11) which has positive and negative terminals (13) on a first end face (9), and alkaline-manganese batteries (21), each of which includes positive (22) and negative (23) terminals on opposite first (8) and second (7) end faces thereof, respectively. The battery receptacle incorporates a receptacle housing (2) having a stationary wall or base (19, 31) for supporting one end of the lithium or alkaline-manganese batteries, and which also incorporates a spacer (4, 32) which is positioned around the alkaline-manganese batteries when they are positioned within the receptacle housing, as well as a lid (6, 33) which is adapted to selectively open and close the receptacle housing. The spacer is rotatably supported by the receptacle housing such that when the alkaline-manganese batteries are positioned within the receptacle, the spacer will be maintained about them, and when the lithium battery is positioned within the housing, the spacer will be positioned over the battery in the housing. Both the stationary wall and the lid have electrical contacts which correspond to the terminals of the alkaline-manganese batteries. Either the stationary wall or base (31), or the spacer (4), is provided with electrical contacts (4a, 36) which correspond to the terminals of the lithium battery to establish contact therewith terminals facing downwardly or its positive and negative terminals facing upwardly, respectively.

79 Claims, 13 Drawing Sheets

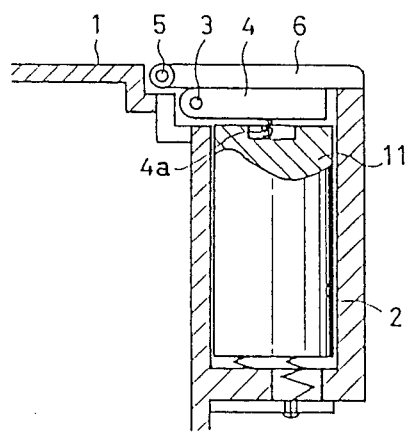
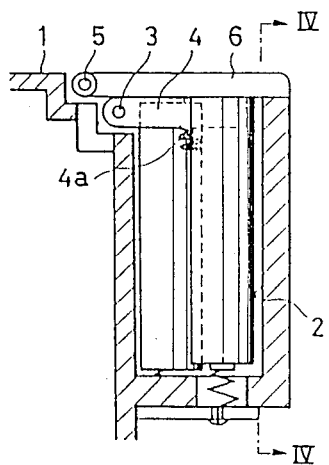
Fig. 2    Fig. 3
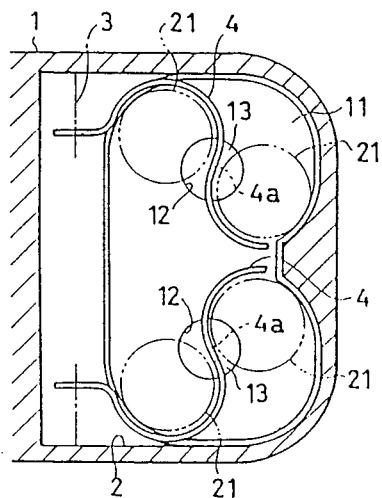
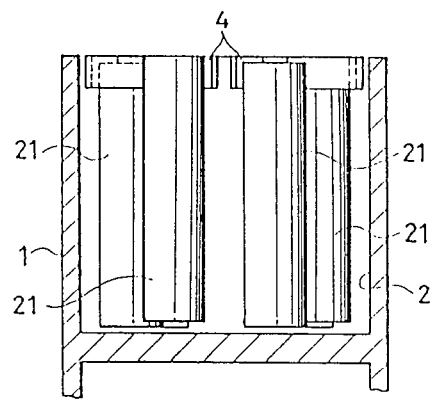
Fig. 5    Fig. 4

BATTERY RECEPTACLE

TECHNICAL FIELD

The present invention generally relates to battery receptacles and more specifically to an improved battery receptacle which is adapted to be used in a camera, and which is capable of selectively receiving long and short batteries, respectively.

BACKGROUND ART

Recently, lithium batteries which can be quickly charged within a relatively short period of time and which have a relatively long discharge period have been widely employed as power sources, e.g., in electronic cameras.

Lithium batteries have not, however, been used to the exclusion of conventional alkaline-manganese batteries, which are still widely used in a variety of applications including use in electronic cameras. Under these circumstances, in which different types of batteries are now being employed, it has become desirable to provide electronic cameras with a battery receptacle which is adapted to utilize either lithium batteries or alkaline-manganese batteries in a simple and efficient matter.

It is not believed, however, that a battery receptacle which is adapted for such dual usage in cameras has yet been developed. The basic reason for this failure to develop such a battery receptacle is that a lithium battery is generally shorter in height than an alkaline-manganese battery, and has both positive and negative terminals on a single end face; whereas, conventional alkaline-manganese batteries each have a positive terminal on one end face and a negative terminal located along an opposite end face thereof.

DISCLOSURE OF INVENTION

It is, therefore, a primary object of the present invention to provide a battery receptacle which is adapted to selectively receive different types of batteries having different heights and different arrangements of positive and negative terminals.

Another object of the present invention is to provide a battery receptacle in which different batteries can be easily and quickly loaded and unloaded from the receptacle, and in which the batteries will be prevented from falling down and/or moving within the receptacle.

In order to achieve these and other objects, in accordance with a first aspect of the present invention, a battery receptacle is provided in which relatively long batteries having positive and negative terminals along opposite end faces, and relatively short batteries having both positive and negative terminals along a single end face, can be selectively and interchangably housed. The receptacle is provided so that it has a housing with a stationary wall for supporting one end face of either a long or a short battery, and a spacer which is provided along a portion of the receptacle housing which is adjacent to the opposite end face of the long or short battery in order to selectively occupy a closed position in which the spacer is located above or around whichever of the batteries is positioned within the receptacle housing, and an open position in which the spacer is retracted from the receptacle housing. The spacer is provided with at least one guide opening through which at least one of the long batteries can be inserted within the receptacle housing, and with an outer lid which is located to the exterior of the spacer in order to open and close the receptacle housing. The stationary wall and the lid are both provided with electrode contacts which are adapted to be brought into contact with respective associated positive and negative terminals on the opposite end faces of the long battery; and at least one of the stationary wall and the spacer are provided with electrical contacts which are adapted to be brought into contact with the positive and negative terminals located at only one end of the short battery.

In a second aspect thereof, the present invention provides for a battery receptacle adapted to selectively receive at least one long battery having positive and negaative terminals on opposite first and second end faces thereof, or at least one short battery having positive and negative terminals on a single end face thereof. The battery receptacle comprises a receptacle housing having a stationary wall comprising means for supporting at least a first end of at least one of each of the batteries.

A spacer is adapted to selectively overlie a second end of at least one of the relatively short batteries when the short batteries are positioned within the housing, the spacer being selectively movable between a first, closed position in which it overlies the stationary wall when at least one battery is positioned with the receptacle housing and an open position in which it is moved away from the housing, the spacer comprising at least one guide opening through which at least one long battery is adapted to be inserted.

A lid is attached to the housing to close an upper end of the housing, wherein each of the stationary wall and the lid are provided with at least one electrical contact which are adapted to abut at least one of the positive and negative terminals on opposite faces of each long battery when the long batteries are positioned within the housing. At least one of the stationary wall and the spacer are provided with an electrical contact which is adapted to abut both of the positive and negative terminals of the short battery when the short battery is positioned within the battery receptacle.

The spacer in one embodiment comprises a pair of bent conductive plates having guide portions which are adapted to receive at least one long battery, each of the conductive bent plates being provided with an electrical contact which is adapted to contact one of the positive and negative terminals of the short battery when the short battery is positioned within the housing. Each of the conductive bent plates has a width, as viewed in the longitudinal direction of a long battery when the long battery is inserted into the receptacle, which is substantially equal to the difference in height between the long battery and the short battery.

The spacer alternately comprises a plate having at least one opening through which a long battery is adapted to be positioned within the receptacle housing. Each of the long batteries can be placed into a substantially stable position within the housing receptable when the batteries are inserted therein.

The spacer can be provided in the form of a plate, wherein the battery maintaining means comprises at least one tongue connected to the spacer plate, with the tongue being adapted to move between a first position in which it is substantially transverse to the extent of the long batteries when they are inserted within the housing and a second position, into which the tongue is elastically moved, in which the tongue is substantially parallel to the axis of the long batteries when they are inserted in the housing receptacle. Each tongue lies in substantially the same plane as the remainder of the spacer when the short battery is inserted in the battery receptacle, and substantially transverse to a main body portion of the spacer when the long batteries are positioned within the battery receptacle. Each of the tongues comprises means for elastically contacting an exterior surface of at least one of the elongated batteries.

The guide openings on the spacer are substantially circular, with each of the tongues also being substantially circular.

The spacer can comprise a plate with at least one opening, wherein the battery maintaining means comprises a plurality of tongues positioned within each of said openings on the spacer plate, each of the tongues extending towards a central portion of each of the guide openings. The stationary wall comprises a base for the housing and includes at least one recess adapted to receive one end of at least one long battery. The spacer plate has a thickness which is represented by d, wherein $d = T - (t + B)$, wherein t is the height of a short battery adapted to be inserted into the receptacle, T is the height of a relatively long battery adapted to be inserted into the receptacle, and H is the depth of the insertion recess in the stationary base; and the spacer is rotatably supported by the receptacle housing and is adapted to rotate between its open position and its closed position. The lid is also rotatably supported by the receptacle housing between open and closed positions over the housing.

In another aspect, the present invention is directed to a battery receptacle adapted to selectively receive at least two different types of batteries having different heights, at least one relatively long battery having a positive terminal on a first end face thereof and a negative terminal on a second end face thereof, or a relatively short battery having positive and negative terminals on a single end surface thereof. The battery receptacle comprises a receptacle housing comprising a base for supporting one end of each battery when the batteries are inserted within the receptacle, and at least one side wall connected to, and extending upwardly from, the base. At least one spacer assembly is connected to an upper portion of the housing, each spacer assembly comprising means for receiving at least one relatively long battery which is adapted to be supported by the base and extend through at least one guide opening in the spacer assembly, and means for contacting one end surface of the second, relatively short battery when the short battery is inserted into the receptacle.

The receptacle housing further comprises a plurality of upstanding side walls connected to the base to define an open top for the housing; and the spacer assembly is connected to the housing and is movable between a closed, operative position in which said spacer is substantially parallel to the base and an open position in which the spacer is moved away from the base and comprises means for permitting insertion and removal of batteries from within the receptacle housing.

The spacer is pivotably connected to said housing, and the housing can further comprise a movable lid which is adapted to overlie the spacer and which thereby comprises means for selectively opening and closing the top of the hqusing. The lid can be pivotably connected to the housing.

Each of the base and the lid comprise at least one electrical contact, wherein each of the electrical contacts is adapted to abut a respective terminal on one of the long batteries. The lid has an inner surface and an outer surface, the inner lid surface comprising a plurality of electrical contact plates attached thereto, each of the electrical plates comprising one pair of electrical contacts. The base includes a plurality of recesses for receiving the ends of a plurality of the long batteries, wherein each of the recesses includes a conductive coiled spring electrical contact positioned therein.

Alternately, at least one of the base or the spacer assembly can include electrical contacts which are adapted to abut the short battery terminals when the short battery is inserted into the housing.

In one embodiment, the spacer is conductive and comprises at least two downwardly extending resilient electrical contacts which are adapted to abut the short battery terminals when the short battery is inserted into the housing with its terminals facing upwardly.

The housing base may include a plurality of contiguous recesses and at least two electrical contacts positioned therein, each of the electrical contacts comprising a leaf spring. Each of the leaf springs comprises two legs for attaching the electrical contacts to the housing base, a bent resilient portion attached to each of the legs, a common contact plate connecting the bent resilient portions, and a projection extending upwardly from the common contact plate and being adapted to contact a terminal of the short battery when the short battery is inserted into the housing with its positive and negative terminals facing the base.

The spacer may comprise two substantially identical spacer elements, each of the spacer elements comprising an electrically conductive material which is attached to at least one positive or negative terminal in the body of an article to which the housing is connected. The article preferably comprises, e.g., an electronic camera.

In one embodiment, each spacer element is generally S-shaped, has a predetermined height (1), and includes a resilient electrical contact extending downwardly from a bottom surface of the spacer element. The height (1) is determined by the equation $(1) = T - t$, wherein T is the height of each relatively long battery and t is the height of the relatively short battery.

Two relatively long batteries are positioned together between the spacer elements and the side wall of the housing, and one additional relatively long battery is positioned between each of the spacer elements and respective second side walls of the housing. The spacer assembly can alternatively comprise at least one non-conductive spacer plate having an upper surface and a lower surface. This non-conductive plate includes two generally circular openings connected to each other along a central portion of the plate, and two arcuate openings located along peripheral portions of the plate, wherein each of the openings comprises means for receiving one of the relatively long batteries.

The plate further comprises a projection extending upwardly from the upper spacer surface of the spacer plate, with the projection being adapted to be engaged by a housing lid closed over the receptacle housing, thereby comprising means for compressing the relatively short battery against the base when the short battery is positioned within the housing.

The plate has a thickness (d) determined in accordance with the equation $d = T - (t + B)$, wherein T is the height of each relatively long battery, t is the height of each relatively short battery, and B is the depth of each one of a plurality of battery receiving recesses located in the base.

At east one generally arcuate tongue can be attached to the plate, which plate has a plurality of openings, which tongue is positioned in at least one of the openings. At least one generally arcuate tongue can be positioned within each of the openings, each tongue being hinged to the plate by a reduced thickness portion, each tongue being pivotable between a first position substantially parallel to the base and a second position substantially perpendicular to the base. Each tongue occupies the second position when the relatively long batteries are inserted therein, with each tongue comprising means for pressing a relatively long battery against a respective side wall of the housing when the long batteries are inserted within the housing.

A plurality of tongues can be provided which extend into each opening. Each tongue can have an upper surface which is substantially coplanar with the upper surface of the plate, or each tongue can have an upper surface offset downwardly from the upper surface of each plate. The housing is attached to an electronic camera and the batteries are adapted to provide power to operate the camera when positioned therein.

The battery receptacle can be used in combination with at least one relatively short lithium battery positioned within the housing, or with a plurality of relatively long alkaline-manganese batteries positioned within the housing.

In another aspect, the present invention provides a battery receptacle which is adapted to selectively receive at least two different types of batteries, a first, relatively long battery having a positive terminal on a first end face thereof and a negative terminal on a second end face thereof, and a second, relatively short battery having both positive and negative terminals on a single end face thereof. The battery receptacle comprises a receptacle housing comprising a base with a plurality of recesses for receiving one end of respective ones of the long batteries when the long batteries are inserted within the housing, the housing further comprising a plurality of side walls extending upwardly from the base, wherein a resilient electrical contact is positioned within each of the recesses.

A spacer assembly is electrically conductive and is movably connected to the housing between a first position in which it overlies and is substantially parallel to the base and a second position in which it does not overlie the base, with the spacer assembly comprising at least one arcuate spacer element having at least one opening for receiving one end of each of the relatively long batteries when the relatively long batteries are positioned in the base recesses within the housing. The spacer assembly comprises at least two downwardly extending resilient electrical contacts extending downwardly from a lower surface of the spacer assembly, which contacts are adapted to contact the positive and negative terminals on the relatively short battery when the relatively short battery is inserted within the housing.

A lid is adapted to close an open top of the receptacle housing, and is movable between a first position in which it overlies the spacer element and a second position in which it is moved away from the top of the receptacle housing. The lid comprises a plurality of electrical contacts which are adapted to contact terminals on the relatively long batteries when the relatively long batteries are inserted within the receptacle housing and the lid is positioned so as to overlie the batteries.

In a further aspect of the present invention, a battery receptacle is adapted to selectively receive at least two different types of batteries, a first, relatively long battery having a positive terminal on a first end face thereof and a negative terminal on a second end face thereof, and a second, relatively short battery having both positive and negative terminals on a single end face thereof. The battery receptacle comprises a receptacle housing comprising a base with a plurality of recesses for receiving one end of respective ones of the long batteries when the long batteries are inserted within the housing. The housing further comprises a plurality of side walls extending upwardly from the base, wherein a resilient electrical contact is positioned within each of the recesses, wherein at least two additional recessed portions are provided in the base, each of the additional recessed portions having a resilient electrical contact positioned therein, each of the additional contact electrodes comprising means for contacting the positive and negative terminals on the relatively short battery when the relatively short battery is inserted into the receptacle housing with its terminals facing downwardly.

A spacer assembly comprises a substantially plate-like element formed from non-conductive material, the plate-like element including a plurality of openings, each of the openings being adapted to receive one end of one of the relatively long batteries, the spacer element being movable between a first position in which it is substantially parallel to the base and a second position in which it is moved away from a top portion of the receptacle housing; and a lid is provided which is adapted to close an open top of the receptacle housing. The lid is movable between a first position in which it overlies the spacer element and a second position in which it is moved away from the top of the receptacle housing; and the lid comprises a plurality of electrical contacts which are adapted to contact terminals on the relatively long batteries when the relatively long batteries are inserted within the receptacle housing and the lid is positioned so as to overlie the batteries.

BRIEF DESCRIPTION OF THE DRAWINGS

The above and other objects, features and advantages of the present invention will now be more fully described with respect to the accompanying drawings, in which like reference numerals illustrate similar parts throughout the several views, and wherein:

FIG. 2 is a sectional view of the battery receptacle of FIG. 1 when a relatively short, lithium battery is positioned therein;

FIG. 3 is a sectional view of the battery receptacle of FIG. 1 in which relatively long, i.e., alkaline-manganese, batteries are positioned therein;

FIG. 4 is a front sectional view of the receptacle of FIG. 3 taken along line IV—IV of FIG. 3;

FIG. 5 is a top sectional view of the battery receptacle of FIG. 1, with a plurality of relatively short batteries positioned therein and with the lid pivoted into an open position;

BEST MODE FOR CARRYING OUT THE INVENTION

Figure 18:
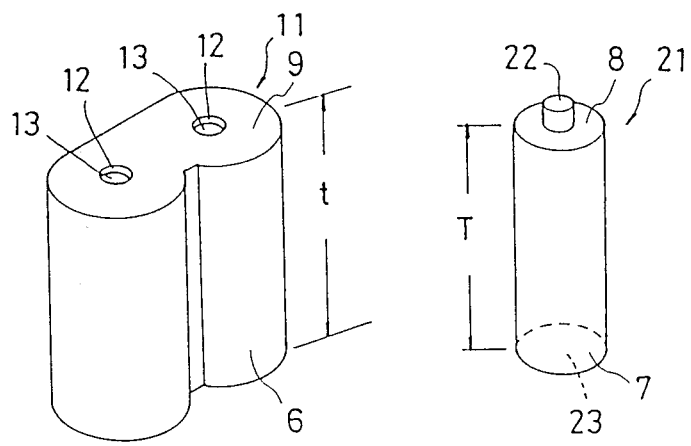
FIG. 18a is a perspective view of one of the relatively long batteries used in accordance with the present invention.
FIG. 18b is a perspective view of a relatively short battery used in accordance with the present invention.

FIGS. 18a and 18b, respectively, illustrate two of the different batteries which the receptacle housing of the present invention is adapted to retain or receive. FIG. 18b illustrates a lithium pack having two lithium batteries located side by side and connected in series, each having three volts of open circuit voltage. The lithium battery 11 has, on a first end face 9, two apertures or recesses 12 which are provided with negative (−) and positive (+) terminals 13, respectively. FIG. 18a illustrates a SUM-4 type of alkaline-manganese battery (with 1.5 Volts of output voltage) 21 which is includes a positive (+) terminal 22 on a first end face 8 and a negative (−) terminal 23 located on a second or opposed end face 7. The height (t) of the lithium battery 11 is less than the height (T) of the alkaline-manganese battery 21.

More specifically, in the embodiments illustrated, the alkaline-manganese battery 21 is a relatively long battery having negative and positive terminals located on its opposite end faces 8 and 7, and the lithium battery 11 is a relatively short battery having both positive and negative terminals 13 located along the same, first end face 9.

FIGS. 1–5 illustrate a first embodiment of a battery receptacle formed in accordance with the present invention; this battery receptacle is adapted to selectively accomodate either of the long and short batteries, alternately, thus permitting a user to use either the lithium battery or the alkaline-manganese batteries to operate the camera to which the battery casing is attached.

As illustrated in FIGS. 1–5, a camera body 1 which is operated by battery power source is provided with a battery receptacle housing 2 (see FIG. 1) which is surrounded by a plurality of walls which form the housing 2. These walls are better shown in the cross-sectional drawings of FIGS. 2–5. The battery receptacle housing 2 includes an open area provided with a pivot shaft 3 which can be attached to opposed walls of the camera housing (see FIG. 5) at respective first ends of the pivot shafts. The second ends of the pivot shaft are connected to respective spacers 4 which are pivotally connected to the shaft. An pivotable outer lid 6 is attached to one or more shafts 5 which are mounted to camera body 1 on the exterior and above spacer elements 4. This pivoting top is adapted to close the housing after the appropriate battery or batteries are inserted therein.

Figure 1:
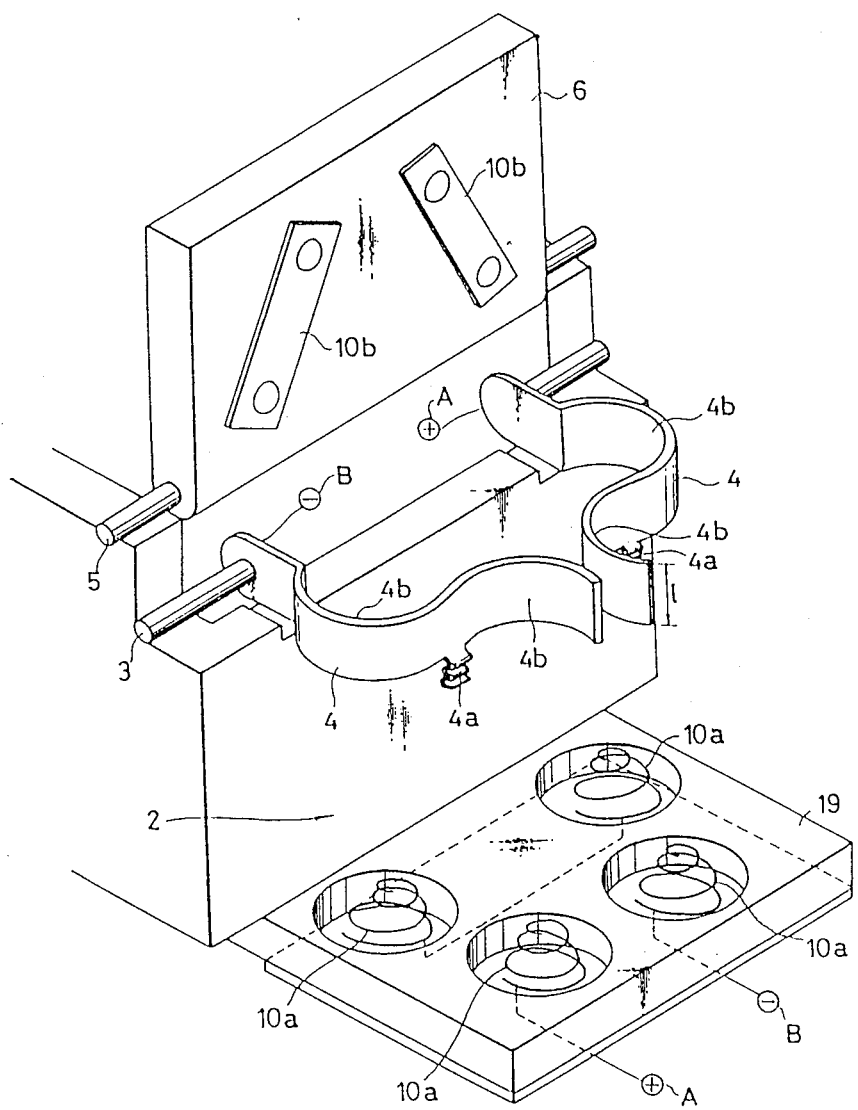
FIG. 1 is a perspective view of a first embodiment of a battery receptacle formed in accordance with the present invention, illustrated with the peripheral wall of the battery receptacle housing, and a camera to which the receptacle is attached, having been partially cut away.

The two spacer elements 4 are identical, and are each formed from an elongated bent or curved plate having electrical conductivity; as illustrated best in FIG. 1, the plates are substantially symmetrical and are oppositely disposed to each other. Each of the spacer elements is generally in the form of an S, taken in plan view, so that these elements have bent guiding surfaces 4b which form receiving openings along both sides thereof and which are adapted to surround jackets 24 of alkaline-manganese batteries 21 when such batteries are positioned with the receptacle housing. Accordingly, four alkaline-manganese batters 21 can be positioned within a pair of opposed spacer elements 4 and can be elastically held between the spacer elements. Each of the conductive elongated plates 4 has a width or height (1) which is substantially equal to the difference in height between each relativey long alkaline-manganese battery 21 and the relatively short lithium battery 11, i.e., $1 = T - t$. Each of the spacer elements 4 also includes a spring-like resilient electrical contact 4a (best shown in FIGS. 1–3) which extends downwardly from a substantially central portion of a lower surface of each curved member, which electrical contacts are provided in a generally corrugated fashion. The electrical contacts 4a are positioned so that they will electrically contact a pair of positive and negative terminals 13 of a lithium battery 11 when such a battery is positioned within receptacle housing 2. Spacer elements 4 are electrically connected to, respectively, a negative (−) terminal (B) and a positive (+) terminal (A) provided in camera body 1, respectively. This is shown schematically in FIG. 1.

A bottom face 19 of receptacle housing 2, as illustrated in FIG. 1, comprises a stationary wall or base on which four electrical contacts 10a are provided for engaing four SUM-4 batteries 21. Each of the contacts 10a comprises a conductive coiled spring positioned in a respective recess in base 19. Similarly, four electrical contacts 10b for the four SUM-4 batteries 21 are provided on the interior surface or face of lid 6, as illustrated in FIG. 1. Electrical contacts 10b comprise conductive plates for establishing electrical connection between the heteropolar terminals 22 and 23 of adjacent SUM-4 batteries 21. Electrical contacts 10a are electrically connected to connect the four SUM-4 batteries 21 in series, as indicated by the imaginary or dashed lines drawn in FIG. 1. Series voltage will be supplied from the positive and negative terminals A and B which are attached to the spring contacts 10a, and to the spacer elements 4.

Figure 19:
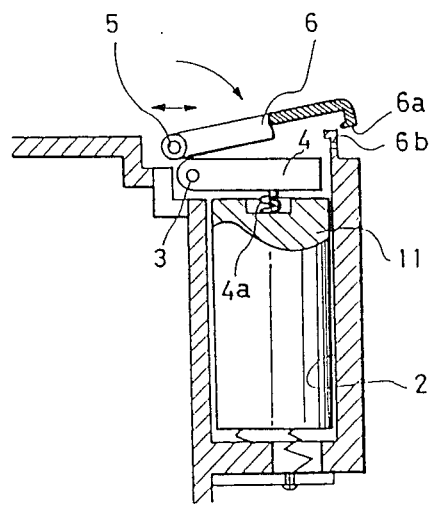
FIG. 19 is a view similar to that of FIG. 2 illustrating a catch for locking a lid to the housing.

With such an arrangement, in accordance with the present invention, in order to place a plurality of SUM-4 batteries into the battery receptacle, lid 6 is pivoted away from housing 2 into an open position (after disconnecting a suitable and conventional latch, one example of which is shown in FIG. 19 of the drawings), and four batteries 21 are positioned within receptacle housing 2 so that they have the polarity arrangement which is illustrated in FIG. 4, in which two of the batteries 21 are positioned with their positive terminals facing downwardly toward base 19 of the receptacle, and in which two of the batteries are positioned such that their positive terminals are facing upwardly and engage contacts 10b on lid 6. When the batteries 21 are positioned within receptacle housing 2, these batteries are guided and retained by the generally S-shaped spacer elements 4. After such positioning, lid 6 is again closed, and batteries 21 will be firmly held by the bent guide surfaces 4b of spacer elements 4 such that batteries 21 will be electrically connected, via electrical contacts 10a and 10b, such that 6 V (equal to 1.5 v×4) of output voltage will be fed.

Figure 20:
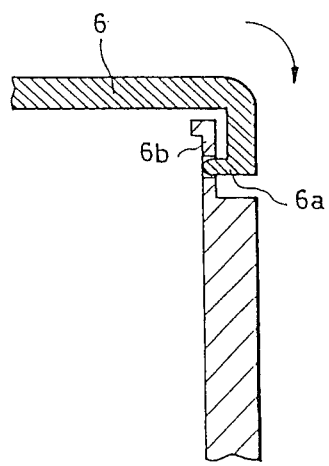
FIG. 20 is a partially cutaway sectional view of the catch and flange of FIG. 19 in an interlocked position.

One latch which is contemplated for use on any of the lids comprises an inwardly directed flange 6a on the lower front edge of lid 6 and an upwardly directed catch 6b on the front vertical wall of housing 2, as shown in FIG. 19. As illustrated in detail in FIG. 20, flange 6a is elastically moved about catch 6b until it engages the catch as lid 6 rotates about shaft 5. Flange 6a and catch 6b are both elastically deformable; and shaft 5 can be rotated and moved longitudinally in a desired fashion as shown in FIG. 19. In other words, when flange 6a and catch 6b are to engage each other in an elastic fashion, the lid will be moved rightwardly.

When a lithium battery 11 is adapted to be positioned within the battery receptacle, both the lid 6 and spacer elements 4 are opened. The spacer elements 4 can be opened by rotating them separately about shafts 3, so that they pivot upwardly until they are in substantial abutment with the inner surface of lid 6. The lithium battery 11 is then positioned within the receptacle housing 2 so that the first end face 9 of the lithium battery 11, which includes the negative and positive terminals 13, is directed upwardly so that the terminals will engage contacts 10b on the inner surface of the lid. After the battery is positioned within the receptacle, lid 6 and the spacer elements are again pivoted into a closed position, such that terminals 13 will be electrically connected to the resilient electrical contacts 4a, as illustrated in FIGS. 2 and 5. The output voltage supplied from this battery is also 6 Volts. A relationship between the height of the S-shaped retaining elements 4 and the difference between the height of the lithium battery and conventional alkaline-manganese batteries must necessarily be provided, because the electrodes of the alkaline-manganese batteries must directly contact contacts 10b on the inner surface of lid 6, whereas the electrical contacts 13 on the lithium battery must contact the resilient electrical contacts 4a which extend downwardly from the bent guide surface 4b of spacer elements 4. In this fashion, suitable electrical contact can be selectively provided for both types of batteries with a single housing structure.

It should be clear that both spacer elements 4 and lid 6 are not limited to the specific embodiments illustrated in the drawings, which illustrate them as being selectively opened and closed by rotation about respective shafts 3 and 5. For example, lid 6 and spacer elements 4 could slide rather than pivot, so that they could be retracted into an upper portion of receptacle housing 2 by sliding motion so as to withdraw the lid and spacer elements from interference with the open top of the receptacle and permit batteries to be inserted therein when the lid and spacer would be moved into such open positions. It would also be possible to connect the spacer elements 4 to each other by means of an insulating connection member (not illustrated in the drawings) so that these two members could be opened and closed simultaneously. In such an alternative structure, the connecting insulating member could be provided with a guide member (also not illustrated) for retaining the SUM-4 batteries 21 whey they are positioned within the receptacle housing.

FIGS. 6–12 illustrate a second embodiment of the present invention, in which electrical contacts for lithium battery 11 and for the SUM-4 batteries 21 are provided on the stationary lower wall or base 31 of the bottom of receptacle housing 2. This is unlike the first embodiment of the present invention, illustrated in FIGS. 1–4, in which electrical contacts 4a for the lithium battery are provided on the lower surfaces of spacer elements 4.

Figure 6:
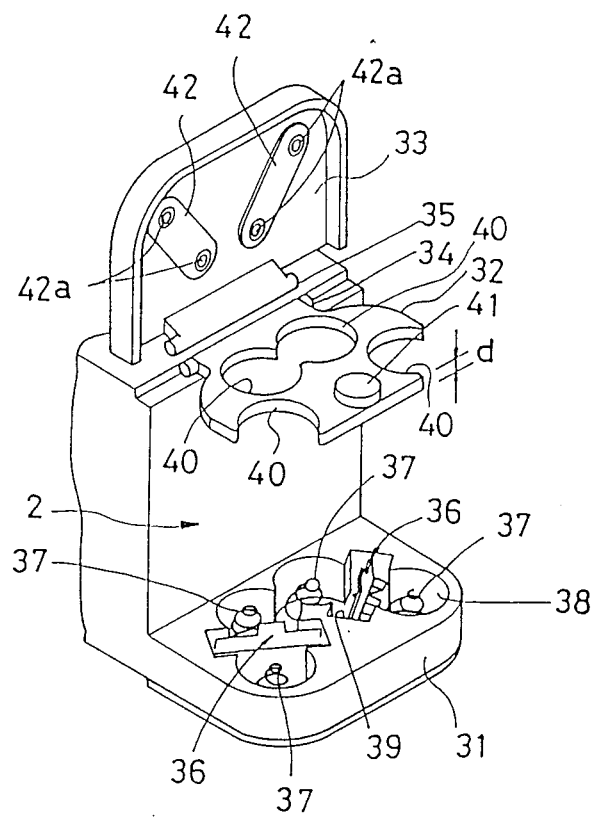
FIG. 6 is a perspective view of a second embodiment of the battery receptacle formed in accordance with the present invention, again being shown with the receptacle housing peripheral wall being partially cut away.

More particularly, for the second embodiment illustrated in FIGS. 6–12, stationary lower wall or base 31, which is adapted to receive the lower end faces of lithium battery 11 and the SUM-4 batteries 21, is provided at the bottom of receptacle housing 2. Spacer element 32 and lid 33 are provided on the opposite side of the receptacle housing 2 from the base when the lid and spacer element are closed, and correspond to the opposite end faces of the batteries which are received in the compartment or receptacle, i.e., they correspond to the upper end faces of lithium battery 11 and SUM-4 batteries 21. Spacer element 31 and lid 33 are positioned such that the spacer element 32 will be capable of being retained within lid 33, i.e., the peripheral area defined by the lid is larger than that defined by the spacer element. Spacer element 32 and the lid are each rotatable about shafts 34 and 35, respectively, in order to open and close. As illustrated in FIG. 6, the shafts are fixed to the receptacle or camera housing 1 such that the members can pivot about the shafts. The spacer element 32 in this embodiment is formed from a plate of insulating material, e.g., synthetic resin.

The stationary wall or base 31 is provided with electrical contacts 36 which will correspond to a pair of downwardly facing positive and negative terminals 13 of lithium battery 11, and is also provided with a plurality of electrical contacts 37 which are adapted to correspond to positive or negative terminals 22 or 23 of a plurality of SUM-4 batteries 21 which are positioned within the receptacle. Each contact 26 is formed from a bent leaf spring, as being illustrated in FIG. 8. Each contact 36 includes a pair of downwardly extending attachment legs 36a, a pair of resilient bent portions 36b which are attached to the downwardly extending attachment legs 36a, and a common contact plate 36c which connects the two spaced, substantially parallel resilient bent portions 36b of each attachment leg 36a. Contact plate 36c has, along its central portion, an upwardly extending projection 36d which is adapted to contact either of the positive or negative terminals 13 of lithium battery 11.

Additionally, electrical contacts 37 are positioned in a symmetrical relationship about a central axis or plane of the camera and symmetrically with respect to contact plates 36c of electrode contacts 36. In this fashion, the four contacts 37 can be electrically connected to corresponding negative terminals 23 of four SUM-4 batteries 21. The electrical contacts 37 are formed from substantially conical or frustoconical resilient springs similar to those illustrated in FIGS. 1-4 as contacts 10a. Contacts 36 and contacts 37 are electrically insulated from each other, as best shown in FIG. 7, which illustrates the overall geometrical relationship of contacts 36 and 37 in plan view in base 31 of the receptacle.

Figure 7:
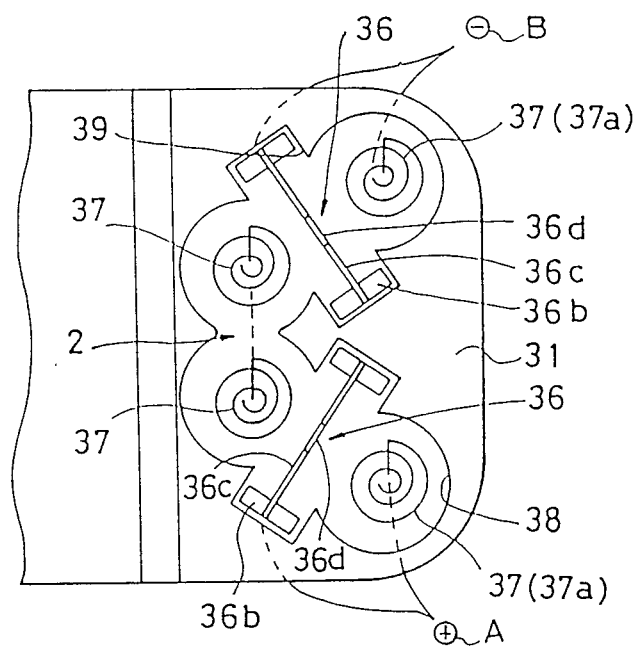
FIG. 7 is a top plan view of the stationary wall or base of the receptacle of FIG. 6.
Figure 8:
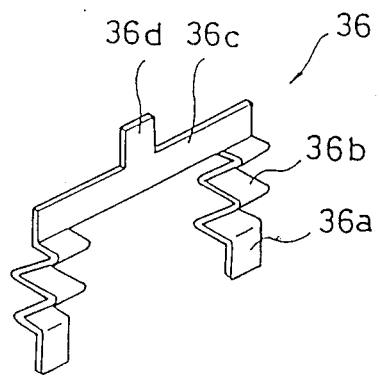
FIG. 8 is a perspective view of an electrical contact used in the base of the receptacle housing of FIG. 6.

A plurality of insertion recesses 38 are illustrated in FIG. 7 in the base 31 of the receptacle which have substantially the same (although slightly larger) diameter as that of each jacket 24 of the respective SUM-4 batteries 21. Additionally, rectangularly-shaped recesses 39 are provided to receive electrical contacts 36, which will be adapted to contact either the positive and negative terminals 13 of lithium batteries 11.

Figure 9:
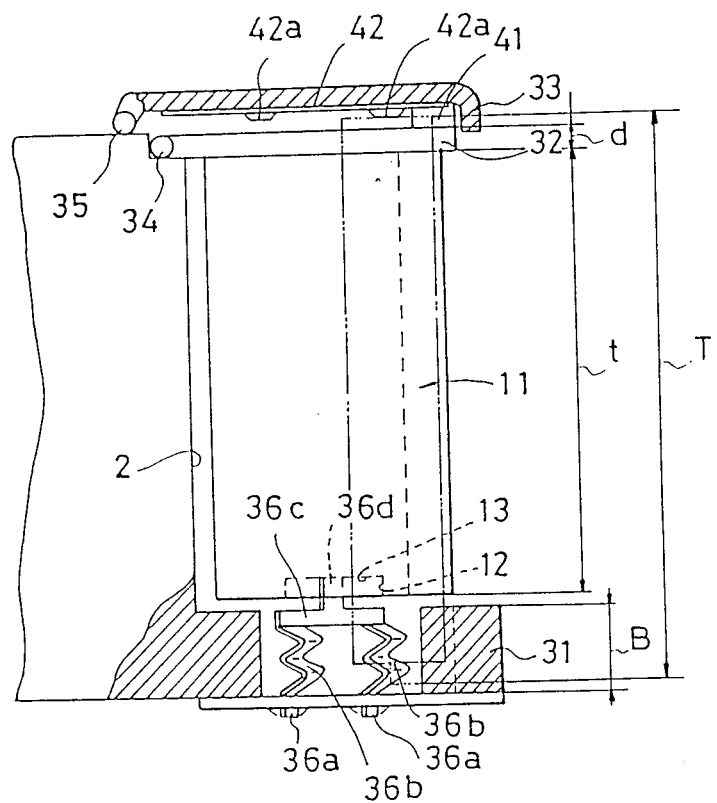
FIG. 9 is a sectional view of the housing of FIG. 6 having a short battery positioned therein as indicated in solid lines, and a long battery as indicated by the dashed lines.

Spacer element 32 is provided so as to have a thickness or height (d) which is substantially identical to the value of what is left when sum of the height (t) of lithium battery 11 and the depth B of each insertion recess 38 is subtracted from the height T of one of the SUM-4 batteries 21, as illustrated in FIG. 9. In other words, the thickness $d = T - (t + B)$. The spacer element 32 will include a plurality of guide recesses 40 for receiving SUM-4 batteries 21. The spacer element 32 will also include a projection 41 extending upwardly from its upper surface which is adapted to be pushed downwardly by lid 33 when lithium battery 11 is positioned within receptacle housing 2. This will serve to press the lithium battery 11 against the base or stationary wall 31, and force positive and negative contacts 13 into adequate electrical contact with electrical contacts 36.

Lid 33 includes a plurality of conductive contact members 42 which are adapted to establish electrical connection between positive and negative terminals 22 and 23 of adjacent alkaline-manganese batteries 21. These contact pieces or plates 42 include projections 42a which are brought directly into contact with positive and negative terminals 22 and 23 of alkaline-manganese batteries 21 when they are positioned within receptacle 2. The contact plates or pieces 42 and electrical contacts 37 located within recesses in the base wall 31 are positioned and electrically connected so as to electrically connect, in series, the four Sum-4 batteries 21. The output voltage will be supplied from a pair of electrical contacts 36, for lithium battery 11, and from a pair of electrical contacts 37a (from among electrical contacts 37) for the alkaline-manganese batteries 21, respectively. This is best illustrated in FIG. 7, in which positive and negative terminals A and B, are illustrated as being connected to electrical contacts 36 and two of the electrodes 37/37a.

In this fashion, the lithium battery 11 and the SUM-4 batteries 21 can be selectively positioned within the battery receptacle, as will now be detailed.

Figure 10:
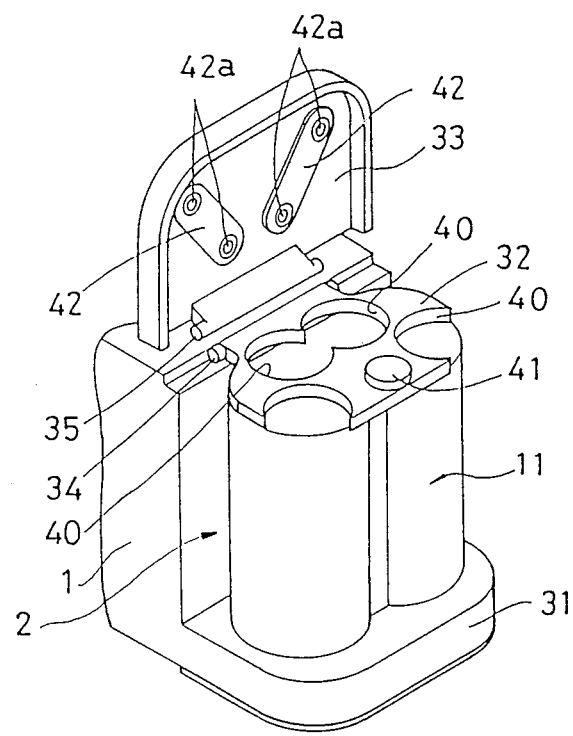
FIG. 10 is a perspective view of the housing of FIG. 6 having a short battery positioned therein.
Figure 11:
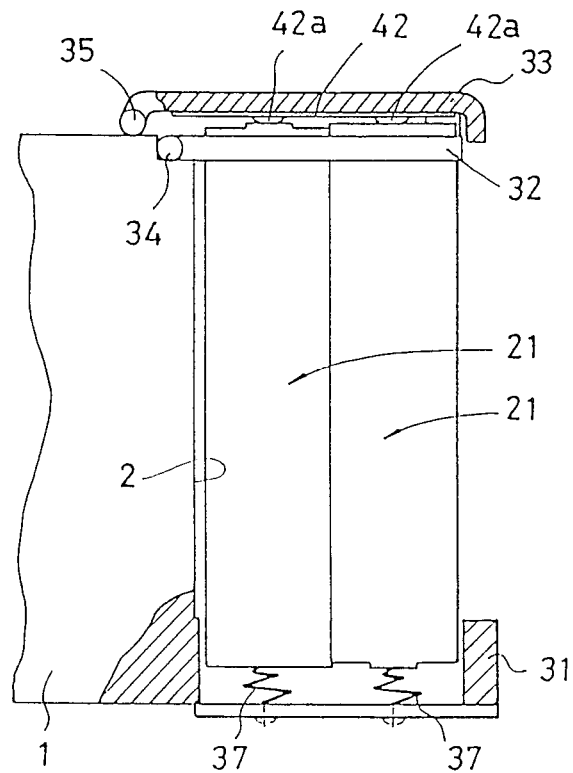
FIG. 11 is a longitudinal sectional view of the battery receptacle of FIG. 6 having a plurality of relatively long batteries positioned therein.
Figure 12:
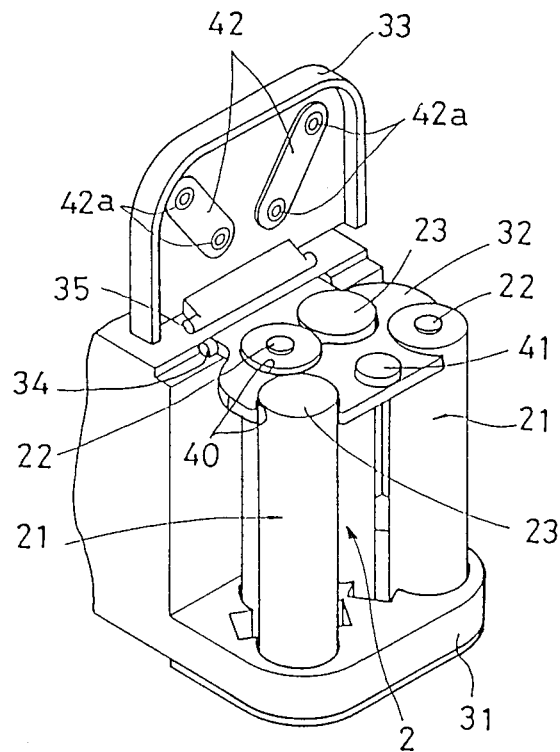
FIG. 12 is a perspective view of the battery receptacle of FIG. 6 having relatively long batteries positioned therein.

When the lithium battery 11 is positioned within the receptacle, it is placed so that its positive and negative terminals 13 face downwardly, as illustrated best in FIGS. 9 and 10. In this fashion, terminals 13 will contact projections 36d of the two electrical contacts 36 positioned within recesses on stationary base wall 31. After so positioning the lithium battery, the spacer element 32 and lid 33 are then pivoted into a closed position and temporarily locked so that they cannot be easily displaced, thus preventing the battery from being unintentionally removed from the receptacle compartment. This can be achieved in conventional fashion, e.g., by a sliding catch, a hook and recess, or other known locking structure.

In this position, the inner or lower face of spacer element 32 is brought into surface engagement or contact with a face of the lithium battery 11, i.e., with surface 6 on the underside of the battery, and lid 33 will press spacer element 32 downwardly by its engagement with the upwardly extending spacer projection 41. This will force the battery downwardly so that the resilient bent portions 36b of electrical contacts 36 will elastically deform, and so that a contacting pressure will be established between upwardly extending projections 36d of each contact electrical 36 and the positive and negative terminals 13 of lithium battery 11. This will enable the output voltage of lithium battery 11 to be supplied from the pair of electrical contacts 36 in base 31 of the receptacle housing.

When, alternately, alkaline-manganese batteries 21 are positioned within the battery receptacle, the four SUM-4 batteries 21 will be inserted into guide recesses or openings 40 in spacer element 32 as well as into reception openings or recesses 38 in base 31. They will be positioned such that the polarities of batteries 21 will be arranged as is illustrated best in FIG. 12. After the batteries are positioned within the receptacles, lid 33 will be closed, so that the generally conical springs which comprise electrical contacts 37 will be compressed to effect contact pressure. This pressure will, in turn, ensure the establishment of an electrical connection between positive and negative terminals 22 and 23 of batteries 21, via conductive contacting plates 42, such that a series output voltage of the four batteries 21 can be supplied by the pair of lower electrical contacts 37a.

Figure 13:
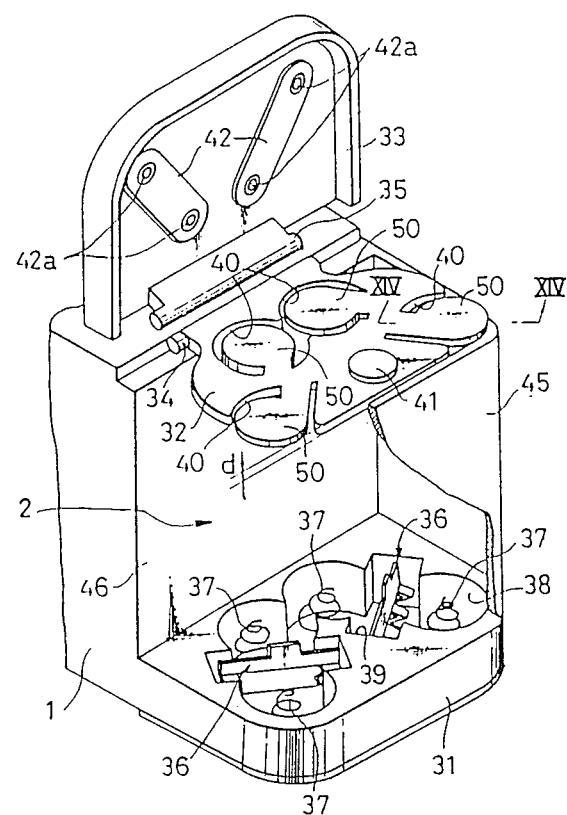
FIG. 13 is a perspective view of a third embodiment of a battery receptacle formed in accordance with the present invention, FIG. 13 again illustrating a receptacle housing having a partially cut away peripheral wall.
Figure 14:
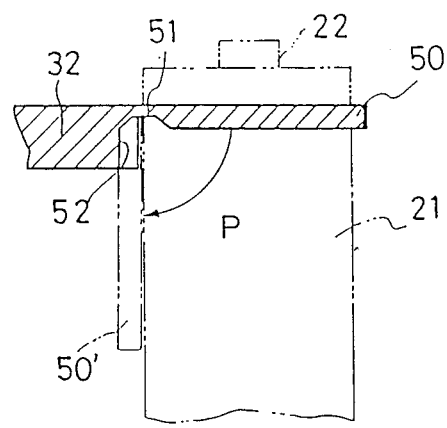
FIG. 14 is a side elevational view of an elastically deformable member taken along line XIV—XIV of FIG. 13.
Figure 15:
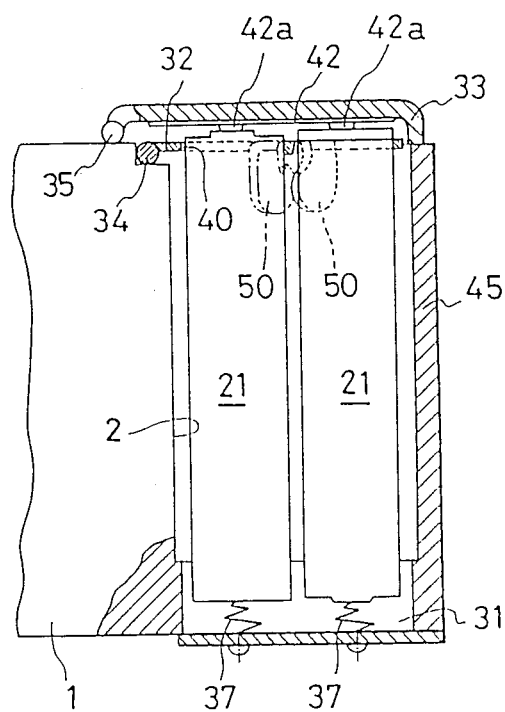
FIG. 15 is a longitudinal sectional view of the battery receptacle of FIG. 13 having a plurality of relatively long batteries positioned therein, and with elastic tongues which have been deformed.

FIGS. 13-15 illustrate a third embodiment of the battery receptacle of the present invention. In this third embodiment, the spacer element 32 includes structure for preventing the SUM-4 batteries 21 from either inclining, leaning or falling down within receptacle housing 2. More specifically, spacer element or plate 32 is provided with a plurality of tongues 50 which are positioned within guiding recesses or apertures 40, and which are integrally attached to the main portion of the spacer element. Each tongue 50 has a shape which includes a substantially circular portion which generally corresponds to the configuration of the periphery of the arcuate guide apertures 40. Each tongue 50 is provided with a relatively narrow portion 51, which is narrow both in width or height (see FIG. 14) and in length. These relatively thin portions connect the circular portions of each tongue 50 with the main body portion of spacer element 32, and permit the tongues 50 to be elastically deformed along these portions, as best illustrated in FIG. 14. Tongues 50 are provided to be located above the base 6 of lithium battery 11 when the lithium battery 11 is positioned within receptacle housing 2, and are adapted to be bent downwardly along their thin connecting portions 51 in the direction illustrated and are adapted to be positioned downwardly, into the position illustrated by the dash lines in FIG. 14, by the SUM-4 batteries 21 when such batteries are positioned within the receptacle housing 2. In other words, thin portions 51 act as hinges which permit the tongues to pivot downwardly when the alkaline-manganese batteries are positioned within the receptacle housing. When so positioned in a substantially vertical downward arrangement, the tongues will abut a portion of the periphery or jacket of each battery 21 and will serve to better retain the batteries in a substantially vertical position within the receptacle.

The spacer element 32 includes a plurality of abutment surfaces 52 which are located adjacent to the relatively thin connecting portions 51 to limit the extent of deformation of tongues 50 to approximately 90°, so that when tongues 50 are bent or pivoted about the hinges from their normal position in which they lie substantially in a horizontal plane, into the bent position 50', as shown in FIG. 14, in which the tongues 50 extend substantially in a vertical direction, they will not be bent further than as illustrated in FIG. 14. As shown in FIG. 15, receptacle housing 2 includes a peripheral outer (side) wall 45 which is continuous and which defines the peripheral portion of the receptacle housing.

When a plurality of SUM-4 batteries 21 are positioned within receptacle housing 2, batteries 21 are inserted into respective guide recesses 40 in the spacer while tongues 50 of the spacer element 32 are forced downwardly by insertion of the alkaline-manganese batteries. When batteries 21 are inserted (properly), tongues 50 will be bent along their inclined or hinged connecting portions 51 into the bent positions 50' illustrated in FIG. 14, in which the bent tongues 50 will elastically bear against jackets 24 of respective batteries 21. As a result, when batteries 21 are completely inserted into insertion recesses 38 in the housing base, a pair of inner batteries 21 and a pair of outer batteries 21 will be elastically contacted against inner wall 46 of the receptacle housing and the opposed outer peripheral wall 45 of receptacle housing 2, respectively, as best shown in FIG. 15. In this fashion, batteries 21 will be firmly retained in receptacle housing 2 without either inclining away from the guide recesses 40 or falling down within these guide recesses. This will ensure satisfactory electrical contact and prevent undesirable movement of the batteries within the receptacle.

After batteries 21 are completely inserted into insertion recesses 38, lid 33 is pivoted downwardly into a closed position, so that elastic contacts 37 will be compressed by batteries 21, resulting in adequate contact pressure and the establishment of an electrical connection. Simultaneously, conductive contact plates 42 will contact the positive and negative terminals 22 and 23 of batteries 21 to establish the desired electrical connection. As a result, the output voltage (i.e., 6 V) of the four batteries which are connected in series will be supplied by the pair of lower terminal electrical contacts 37a.

The lithium battery 11 can be positioned in receptacle housing 2 in a fashion which is similar to that of the second embodiment described in FIGS. 6-12, and it will therefore not be necessary to redetail this positioning herein. However, it should be noted that the tongues will not interfere with such positioning, insofar as the spacer plate 32 will be pivoted outwardly when the lithium battery is inserted therein, and the tongues will be positioned over the battery after it is inserted into the battery compartment.

Figure 16:
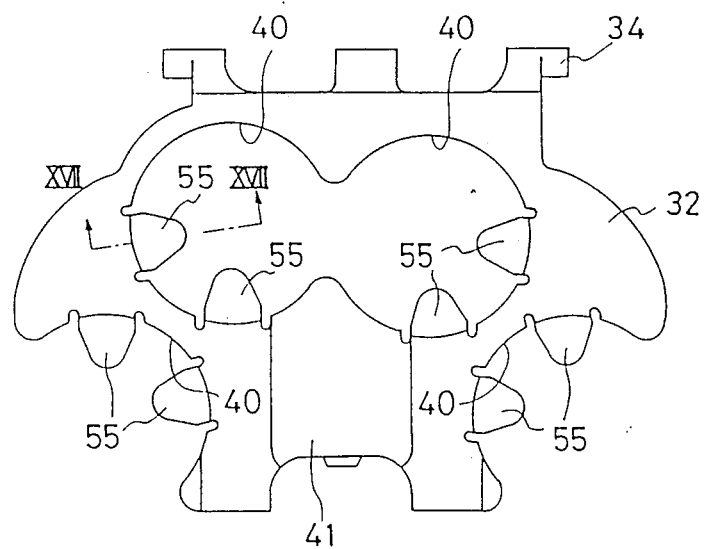
FIG. 16 is a top plan view of a fourth embodiment of the battery receptacle formed in accordance with the present invention, with FIG. 16 being a plan view of a spacer used in such a fourth embodiment.
Figure 17:
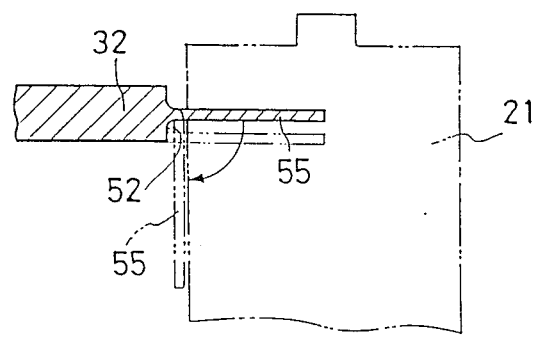
FIG. 17 is a sectional view taken along line XVII—XVII in FIG. 16.

FIGS. 16 and 17 illustrate a fourth embodiment of the present invention, in which spacer plate 32 is provided with a plurality of tongues 55 which integrally extend inwardly from recesses 40 towards the central portion of each of the recesses. Rather than having a single tongue 50 associated with each recess 40, a plurality of inwardly extending tongues 55 are associated with each recess. Each tongue 55 is relatively thin, even in comparison to the thickness of tongues 50, which included partial thin connection portions 51, as illustrated in the third embodiment of FIGS. 13-15. Tongues 55 are thus entirely elastically deformable, but are particularly elastically deformable at the connection between each tongue 55 and the main body portion of spacer plate 32 which essentially defines part of the peripheral edge portion of each recess 40.

In this illustrated fourth embodiment, a pair of tongues 55 are associated with each of guide recesses 40, and are spaced therefrom. Tongues 55 are positioned such that the inwardly extending portions of the tongues within a given guide recess 40 will intersect at a central portion of each recess; however, the tongues do not extend so far into the recess. At least one tongue 55 in each of the guide recesses 40 adjacent inner wall 46 of the receptacle, (which is illustrated in FIG. 13) is positioned so that elastic restoration of tongue 55, after being bent by the insertion of a respective alkaline-manganese battery 21, will cause the battery in the recess 40 within which the tongue is positioned to be pressed against inner wall 46 of receptacle housing 2.

On the other hand, tongues 55 in each of the two outer guide recesses 40 adjacent to outer peripheral wall 45 of receptacle housing 2 are positioned such that elastic restoration of these bent tongues 55 will cause batteries 21 in the associated recesses 40 to be pressed against the outer peripheral wall 45. Although two tongues 55 are illustrated as being associated with each guide recess 40, it is not necessary to limit the number of tongues to two per recess, and a greater number than two tongues could be associated with each guide recess 40, provided that the elastic restoration action of each bent tongue 55 which will serve to force batteries 21 in a desired direction into contact with an inner peripheral wall of the battery chamber or receptacle will be taken into consideration.

Preferably, tongues 55 extend inwardly from intermediate portions of the thickness of spacer plate 32, as best illustrated in FIG. 17, such that abutment surfaces 52 located along the periphery of recesses 40 will be provided both in the vicinity of, and below, the connection of tongues 55 to spacer plate 32. In this fashion, when the innermost portion of tongues 55 act as hinges (as do portions 51 in the third embodiment of the invention), surfaces 52 act to limit the deformation of tongues 55 when they are moved into their vertical position 55', as illustrated in FIG. 17. Alternately, it would also be possible to provide tongues 55 with lower surfaces which would be substantially flush with the lower surfaces of spacer plate 32, and which could also be hinged downwardly. In this instance there would be no engagement of an abutment surface with the tongue when it is pivoted or hinged inwardly. This would be a preferable embodiment because it would result in easier molding of tongues 55, and is illustrated by the dash lines in FIG. 17.

Tongues 55 which are illustrated in the fourth embodiment of the invention also serve to firmly maintain batteries 21 within receptacle housing 2 while preventing accidental motion or inclination of batteries 21, in a fashion similar to that in the third embodiment of FIGS. 13-15.

Although tongues 50 and 55 are illustrated as being integrally formed with spacer element 32 in the third and fourth embodiments of the present invention, either of the tongues can be formed members which are separate from spacer element 32. In such an alternative embodiment, either of tongues 50 or 55 could be connected to spacer element 32 by rotating shafts (not illustrated in the drawings), and could be continuously biased into a normal position downwardly, in which the tongues would be located within associated guide recesses 40, by return springs (also not illustrated in the drawings). Similarly, other methods of using downwardly hinged tongues which would serve to bias the batteries into engagement with the inner surfaces of the battery compartment are equally contemplated as being within the scope of the present invention.

It is evident that the number and type of batteries which could be positioned within the battery receptacle of the present invention are not limited to the precise number and type which are described in the discussed embodiments of the present case. For example, the concept of the present invention could equally well be applied to more or less than four alkaline-manganese batteries 21, if they were required to power a camera or other electronic instrument.

Several embodiments of the present invention could be used in conjunction with any electrical or electronic instruments or devices, e.g., electronic cameras, in which one or more battery types (e.g., differently sized batteries) can be selectively used to power such devices.

Although the present invention has been described with respect to specific embodiments thereof, it is equally contemplated that there are obvious changes in the features and advantages of the present invention which would be within the scope of the present invention as it is defined by the claims which are attached hereto.

What is claimed is:

1. A battery receptacle adapted to selectively receive at least one long battery having positive and negative terminals on opposite first and second end faces thereof or at least one short battery having positive and negative terminals on a single end face thereof, said battery receptacle comprising:
   (a) a receptacle housing having a stationary wall comprising means for supporting at least a first end of each of at least one of said batteries;
   (b) a spacer adapted to selectively overlie a second end of said relatively short battery when said short battery is positioned within said housing, said spacer being movable between a first, closed position in which it overlies said stationary wall when at least one battery is positioned with said receptacle housing and an open position in which it is moved away from said housing, said spacer comprising at least one guide opening through which at least one long battery is adapted to be inserted; and
   (c) a lid attached to said housing to close one end of said housing, said lid being positioned exteriorly of said spacer, each of said stationary wall and said lid being provided with at least one electrical contact which is adapted to abut at least one of the positive and negative terminals on opposite faces of a long battery when at least one long battery is positioned within said housing, wherein at least one of said stationary wall and said spacer is provided with electrical contacts which are adapted to abut both of the positive and negative terminals of said short battery when said short battery is positioned within said battery receptacle.

2. A battery receptacle in accordance with claim 1, wherein said spacer comprises a pair of bent conductive plates having guide portions which are adapted to receive at least one long battery, each of said conductive bent plates being provided with an electrical contact which is adapted to contact one of the positive and negative terminals of said short battery when said short battery is positioned within said housing.

3. A battery receptacle in accordance with claim 2 wherein each of said conductive bent plates has a width, as viewed in the longitudinal direction of a long battery when said long battery is inserted into said receptacle, which is substantially equal to the difference in height between one said long battery and one said short battery.

4. A battery receptacle in accordance with claim 1, wherein said spacer comprises a plate having at least one opening through which a long battery is adapted to be positioned within said receptacle housing.

5. A battery receptacle in accordance with claim 1 further comprising means for maintaining each of said long batteries in a substantially stable position within said housing receptacle when said long batteries are inserted therein.

6. A battery receptacle in accordance with claim 5 wherein said spacer comprises a plate, said battery maintaining means comprising at least one tongue connected to said spacer plate, said tongue being adapted to move between a first position in which said tongue is substantially transverse to the extent of said long batteries when inserted within said housing and a second position, into which said tongue is elastically moved, and in which said tongue is substantially parallel to the axis of said long batteries when inserted in said housing receptacle.

7. A battery receptacle in accordance with claim 6 wherein each said tongue lies in substantially the same plane as the remainder of said spacer when said short battery is inserted in said battery receptacle, and substantially transverse to a main body portion of said spacer when said long batteries are positioned within said battery receptacle.

8. A battery receptacle in accordance with claim 7 wherein each of said tongues comprises means for elastically contacting an exterior surface of at least one of said long batteries.

9. A battery receptacle in accordance with claim 8 wherein said guide openings on said spacer are substantially circular, and wherein each of said tongues is also substantially circular.

10. A battery receptacle in accordance with claim 5, wherein said spacer comprises a plate with at least one opening, said battery maintaining means comprising a plurality of tongues positioned within each of said openings on said spacer plate, each of said tongues extending towards a central portion of each of said openings.

11. A battery receptacle in accordance with claim 4, wherein said stationary wall comprises a base for said housing and includes at least one recess adapted to receive an end of at least one long battery.

12. A battery receptacle in accordance with claim 11, wherein said spacer plate has a thickness which is represented by d, whrein $d = T - (t + B)$, wherein t is the height of a short battery adapted to be inserted into said receptacle, T is the height of a relatively long battery adapted to be inserted into said receptacle, and B is the depth of said insertion recess in said stationary base.

13. A battery receptacle in accordance with claim 1, wherein said spacer is pivotably supported by said receptacle housing and is adapted to rotate between said open position and said closed position.

14. A battery receptacle in accordance with claim 1, wherein said lid is rotatably supported by said receptacle housing.

15. A battery receptacle adapted to selectively receive at least two different types of batteries having different heights, at least one relatively long battery having a positive terminal on a first end face thereof and a negative terminal on a second end face thereof, or a relatively short battery having positive and negative terminals on a single end surface thereof, said battery receptacle comprising:
(a) a receptacle housing comprising a base for supporting one end of each battery which is inserted into said receptacle, and at least one side wall connected to, and extending from, said base; and
(b) at least one spacer assembly connected to a portion of said housing, each spacer assembly comprising means for receiving at least one relatively long battery which is adapted to be supported by said base and extend through said spacer assembly, and means for connecting one end surface of said relatively short battery when said short battery is inserted into said receptacle, said spacer assembly being movable between a first, closed position and a second, open position for enabling said receptacle housing to receive said relatively short battery when said spacer is positioned in said open position.

16. A battery receptacle in accordance with claim 15 wherein said receptacle housing further comprises a plurality of connected upstanding side walls connected to said base to define an open top for said housing.

17. A battery receptacle in accordance with claim 15, wherein said spacer is pivotally connected to said housing.

18. A battery receptacle in accordance with claim 16, wherein said housing further comprises a movable lid which is adapted to overlie said spacer and which thereby comprises means for selectively opening and closing the top of said housing.

19. A battery receptacle in accordance with claim 18 wherein said lid is pivotally connected to said housing, said lid further comprising a resilient flange adapted to engage a substantially upwardly extending resilient catch on said housing.

20. A battery receptacle in accordance with claim 18, wherein each of said base and said lid comprise at least one electrical contact, wherein each of said electrical contacts is adapted to abut a respective terminal on one of said long batteries.

21. A battery receptacle in accordance with claim 20, wherein said lid has an inner surface and an outer surface, said inner lid surface comprising a plurality of electrical plates attached thereto, each of said electrical plates comprising one pair of electrical contacts.

22. A battery receptacle in accordance with claim 20, wherein said base includes a plurality of recesses for receiving the ends of a plurality of said long batteries, wherein each of said recesses includes a conductive coiled spring electrical contact positioned therein.

23. A battery receptacle in accordance with claim 18, wherein at least one of said base or said spacer includes electrical contacts which are adapted to abut said short battery terminals when said short battery is inserted into said housing.

24. A battery receptacle in accordance with claim 23, wherein said spacer is conductive and comprises at least two downwardly extending resilient electrical contacts which are adapted to abut said short battery terminals when said short battery is inserted into said housing with its terminals facing upwardly.

25. A battery receptacle in accordance with claim 23, wherein said base includes a plurality of contiguous recesses and at least two electrical contacts positioned therein, each of said electrical contacts comprising a leaf spring.

26. A battery receptacle in accordance with claim 25, wherein each of said leaf springs comprises two legs for attaching each of said two electrical contacts to said housing base, a bent resilient portion attached to each of said legs, a common contact plate connecting said bent resilient portions, and a projection extending upwardly from said contact plate and adapted to contact a terminal of said short battery when said short battery is inserted into said housing with its positive and negative terminals facing said base.

27. A battery receptacle in accordance with claim 15, wherein said spacer comprises two substantially identical spacer elements, each of said spacer elements comprising an electrically conductive material which is attached to at least one positive or negative terminal in the body of an article to which said housing is connected.

28. A battery receptacle in accordance with claim 27, wherein said article comprises an electronic camera.

29. A battery receptacle in accordance with claim 27, wherein each spacer element is generally S-shaped, has a predetermined height (l), and includes a resilient electrical contact extending downwardly from a bottom surface thereof.

30. A battery receptacle in accordance with claim 29, wherein said height (l) is determined by the equation $(l) = T - t$, wherein T is the height of said relatively long battery and t is the height of said relatively short battery.

31. A battery receptacle in accordance with claim 27, wherein two relatively long batteries are positioned together between said spacer elements and one side wall of said housing, and wherein one additional relatively long battery is positioned between each of said spacer elements and a second side wall of said housing.

32. A battery receptacle in accordance with claim 15, wherein said spacer assembly comprises at least one non-conductive spacer plate having an upper surface and a lower surface.

33. A battery receptacle in accordance with claim 32, wherein said non-conductive plate includes two generally circular openings connected to each other along a central portion of said plate, and two arcuate openings located along peripheral portions of said plate, wherein each of said openings comprises means for receiving one of said relatively long batteries.

34. A battery receptacle in accordance with claim 32, further comprising a projection extending upwardly from said an upper surface of said spacer plate, said projection being adapted to be engaged by a housing lid closed over said receptacle housing, said projection thereby comprising means for compressing said relatively short battery against said base when said short battery is positioned within said housing.

35. A battery receptacle in accordance with claim 32, wherein said plate has a thickness (d) determined in accordance with the equation $d = T-(t+B)$, wherein T is the height of each relatively long battery, t is the height of each relatively short battery, and B is the depth of each one of a plurality of battery receiving recesses located in said base.

36. A battery receptacle in accordance with claim 32, wherein said plate has a plurality of openings, at least one generally arcuate tongue being attached to said plate and positioned in at least one of said openings.

37. A battery receptacle in accordance with claim 36, wherein at least one generally arcuate tongue is positioned within each of said openings, each said tongue being hinged to said plate by a reduced thickness portion, each tongue being pivotable between a first position substantially parallel to said base and a second position substantially perpendicular to said base.

38. A battery receptacle in accordance with claim 37, wherein each tongue occupies said second position when said relatively long batteries are inserted therein, with each tongue comprising means for pressing a relatively long battery against a respective side wall of said housing when said long batteries are inserted within said housing.

39. A battery receptacle in accordance with claim 37, further comprising a plurality of tongues extending into each opening.

40. A battery receptacle in accordance with claim 37, wherein each tongue has an upper surface which is substantially coplanar with the upper surface of said plate.

41. A battery receptacle in accordance with claim 36, wherein each tongue has an upper surface offset downwardly from the upper surface of each plate.

42. A battery receptacle in accordance with claim 15, wherein said housing is attached to an electronic camera and said batteries are adapted to provide power for said camera when positioned therein.

43. A battery receptacle in accordance with claim 42, in combination with at least one relatively short lithium battery positioned within said housing.

44. A battery receptacle in accordance with claim 42, in combination with a plurality of relatively long alkaline-manganese batteries positioned within said housing.

45. A battery receptacle aadapted to selectively receive at least two different types of batteries, a first, relatively long battery having a positive terminal on a first end face thereof and a negative terminal on a second end face thereof, and a second, relatively short battery having both positive and negative terminals on a single end face thereof, said battery receptacle comprising:
(a) a receptacle housing comprising a base with a plurality of recesses for receiving one end of respective ones of said long batteries when said long batteries are inserted within said housing, said housing further comprising a plurality of side walls extending from said base, wherein a resilient electrical contact is positioned within each of said recesses;
(b) an electrically conductive spacer assembly movably connected to said housing between a first position in which it is substantially parallel to said base and a second position in which it does not overlie said base, said spacer assembly comprising at least one arcuate spacer element having at least one opening for receiving one end of each of said relatively long batteries when said relatively long batteries are positioned in said base recesses within said housing, said spacer assembly comprising at least two resilient electrical contacts extending from a surface of said spacer assembly which are adapted to contact said positive and negative terminals on said relatively short battery when said relatively short battery is inserted within said housing; and
(c) a lid adapted to close an open end of said receptacle housing, said lid being movable between a first position in which it overlies said spacer element and a second position in which it is moved away from the end of said receptacle housing, said lid comprising a plurality of electrical contacts which are adapted to contact terminals on said relatively long batteries when said relatively long batteries are inserted within said receptacle housing and when said lid is positioned so as to overlie said batteries.

46. A battery receptacle adapted to selectively receive at least two different types of batteries, a first, relatively long battery having a positive terminal on a first end face thereof and a negative terminal on a second end face thereof, and a second, relatively short battery having both positive and negative terminals on a single end space thereof, said battery receptacle comprising:
(a) a receptacle housing comprising a base with a plurality of recesses for receiving one end of respective ones of said long batteries when said long batteries are inserted in said housing, said housing further comprising a plurality of side walls extending from said base, wherein a resilient electrical contact is positioned within each of said recesses, wherein at least two additional recesses are provided in said base, each of said additional recesses having a resilient electrical contact positioned therein, said additional electrical contacts comprising means for contacting said positive and negative terminals on said relatively short battery when said relatively short battery is inserted into said receptacle housing with its terminals facing downwardly;
(b) a spacer assembly comprising a substantially plate-like element formed from non-conductive material, said plate-like element including a plurality of openings, each of said openings being adapted to receive one end of one of said relatively long batteries, said spacer element being movable between a first position in which it is substantially parallel to said base and a second position in which it is moved away from said receptacle housing; and
(c) a lid adapted to close an open end of said receptacle housing, said lid being movable between a first position overlying said spacer element and a second position in which it is moved away from the open end of said receptacle housing, said lid comprising a plurality of electrical contacts which are adapted to contact terminals on said relatively long batteries when said relatively long batteries are inserted within receptacle housing and said lid is positioned so as to overlie said batteries.

47. A battery receptacle in accordande with claim 1, wherein said lid is positioned outwardly of said spacer, said lid and said spacer being independently pivotably connected to said housing.

48. A battery receptacle in accordance with claim 47, wherein said lid is positioned above said spacer.

49. A battery receptacle in accordance with claim 15, wherein said housing includes a pivotable lid positioned outwardly of said spacer assembly, said spacer assembly and said lid being independently pivotably connected to said housing.

50. A battery receptacle in accordance with claim 49, wherein said lid is positioned above said spacer assembly.

51. A battery receptacle in accordance with claim 45 wherein said lid is positioned outwardly of said spacer, said lid and said spacer being independently pivotably connected to said housing.

52. A battery receptacle in accordance with claim 51 wherein said lid is positioned above said spacer.

53. A battery receptacle in accordance with claim 46 wherein said lid is positioned outwardly of said spacer assembly, said spacer assembly and said lid being independently pivotably connected to said housing.

54. A battery receptacle in accordance with claim 53, wherein said lid is positioned above said spacer assembly.

55. A battery receptacle in accordance with claim 1, wherein said spacer is adapted to overlie substantially the entire cross sectional area of the receptacle housing.

56. A battery receptacle in accordance with claim 15, wherein said spacer assembly is adapted to overlie substantially the entire cross sectional area of the receptacle housing.

57. A battery receptacle in accordance with claim 46, wherein said spacer assembly is adapted to overlie substantially the entire cross sectional area of the receptacle housing.

58. A battery receptacle in accordance with claim 1, wherein said stationary wall comprises a base having a plurality of recesses for supporting said relatively long batteries, and an upper surface comprising means for supporting said relatively short battery.

59. A battery receptacle in accordance with claim 15, wherein said housing base includes a plurality of recesses for supporting said relatively long batteries, and an upper surface comprising means for supporting said relatively short battery.

60. A battery receptacle in accordance with claim 45, wherein said base has an upper surface comprising means for supporting one end of said relatively short battery.

61. A battery receptacle in accordance with claim 46, wherein said base an upper surface comprising means for supporting one end of said relatively short battery.

62. A battery receptacle in accordance with claim 15, wherein said receptacle housing further comprises a plurality of connected side walls connected to said base so as to define an open end for said housing.

63. A battery receptacle in accordance with claim 1, wherein said one end of said housing comprises an upper end of said housing.

64. A battery receptacle in accordance with claim 45, wherein said open end of said housing comprises the open top of the housing.

65. A battery receptacle in accordance with claim 46, wherein said open end of said receptacle housing comprises an open top of said housing.

66. A battery receptacle in accordance with claim 15, wherein said at least one side wall extends upwardly from said base, and said at least one spacer assembly is connected to an upper portion of said housing.

67. A battery receptacle in accordance with claim 45, wherein said side walls extend upwardly from said base.

68. A battery receptacle in accordance with claim 46, wherein said side walls extend upwardly from said base, and wherein said spacer assembly, when in said second position, is moved away from a top portion of said receptacle housing.

69. A battery receptacle in accordance with claim 47, wherein said electrical contacts extend downwardly from a lower surface of said spacer assembly.

70. A battery receptacle adapted to selectively receive at least two different types of batteries having different heights, at least one relatively long battery having a positive terminal on a first end face thereof and a negative terminal on a second end face thereof, or a relatively short battery having positive and negative terminals on a single end surface thereof, said battery receptacle comprising:
(a) a receptacle housing comprising a base for supporting one end of each battery which is inserted into said receptacle, and at least one sidewall connected to, and extending from, said base; and
(b) at least one spacer assembly connected to a portion of said housing, each spacer assembly comprising means for receiving at least one relatively long battery which is adapted to be supported by said base and extend through said spacer assembly, and means for contacting one end surface of said relatively short battery when said short battery is inserted into said receptacle, said receptacle housing further comprising a plurality of connected upstanding sidewalls connected to said base to define an open top for said housing, said spacer assembly being connected to said housing and being movable between a closed, operative position in which said spacer is substantially parallel to said base and an open position in which the spacer is moved away from said base and comprises means for permitting insertion and removal of batteries within said receptacle housing.

71. A battery receptacle adapted to selectively receive at least two different types of batteries having different heights, at least one relatively long battery having a positive terminal on a first end face thereof and a negative terminal on a second end face thereof, or a relatively short battery having positive and negative terminals on a single end surface thereof, said battery receptacle comprising:
(a) a receptacle housing comprising a base for supporting one end of each battery which is inserted into said receptacle, and at least one sidewall connected to, and extending from, said base; and
(b) at least one spacer assembly connected to a portion of said housing, each spacer assembly comprising means for receiving at least one relatively long battery which is adapted to be supported by said base and extend through said spacer assembly, and means for contacting one end surface of relatively short battery when said short battery is inserted into said receptacle, said housing further comprising a movable lid which is adapted to overlie said spacer and which thereby comprises means for selectively opening and closing the top of said housing, said lid being pivotably connected to said housing and further comprising a resilient flange adapted to engage a substantially upwardly extending resilient catch on said housing.

72. A battery receptacle adapted to selectively receive at least two different types of batteries having different heights, at least one relatively long battery having a positive terminal on a first end face thereof and a negative terminal on a second end face thereof, or a relatively short battery having positive and negative terminals on a single end surface thereof, said battery receptacle comprising:
   (a) a receptacle housing comprising a base for supporting one end of each battery which is inserted into said receptacle, and at least one sidewall connected to, and extending from, said base; and
   (b) at least one spacer assembly connected to a portion of said housing, each spacer assembly comprising means for receiving at least one relatively long battery which is adapted to be supported by said base and extend through said spacer assembly, and means for contacting one end surface of said relatively short battery when said short battery is inserted into said receptacle, said housing further comprising a movable lid which is adapted to overlie said spacer and which thereby comprises means for selectively opening and closing the top of said housing, each of said base and said lid comprising at least one electrical contact, wherein each of said electrical contacts is adapted to abut a respective terminal on one of said long batteries.

73. A battery receptacle adapted to selectively receive at last two different types of batteries having different heights, at least one relatively long battery having a positive terminal on a first end face thereof and a negative terminal on a second end face thereof, or a relatively short battery having positive and negative terminals on a single end surface thereof, said battery receptacle comprising:
   (a) a receptacle housing comprising a base for supporting one end of each battery which is inserted into said receptacle, and at least one sidewall connected to, and extending from, said base; and
   (b) at least one spacer assembly connected to a portion of said housing, each spacer assembly comprising means for receiving at least one relatively long battery which is adapted to be supported by said base and extend through said spacer assembly, and means for contacting one end surface of said relatively short battery when said short battery is inserted into said receptacle, wherein said spacer comprises two substantially identical spacer elements, each of said spacer elements comprising an electrically conductive material which is attached to at least one positive or negative terminal in the body of an article to which said housing is connected.

74. A battery receptacle adapted to selectively receiver at last two different types of batteries having different heights, at least one relatively long battery having a positive terminal on a first end face thereof and a negative terminal on a second end face thereof, or a relatively short battery having positive and negative terminals on a single end surface thereof, said battery receptacle comprising:
   (a) a receptacle housing comprising a base for supporting one end of each battery which is inserted into said receptacle, and at least one sidewall connected to, and extending from, said base; and
   (b) at last one spacer assembly connected to a portion of said housing, each spacer assembly comprising means for receiving at least one relatively long battery which is adapted to be supported by said base and extend through said spacer assembly, and means for contacting one end surface of said relatively short battery when said short battery is inserted into said receptacle, wherein said spacer assembly comprises at least one non-conductive spacer plate having an upper surface and a lower surface, said non-conductive plate including two generally circular openings connected to each other along a central portion of said plate, and two arcuate openings located along peripheral portions of said plate, wherein each of said openings comprises means for receiving one of said relatively long batteries.

75. A battery receptacle adapted to selectively receive at least two different types of batteries having different heights, at least one relatively long battery having a positive terminal on a first end face thereof and a negative terminal on a second end face thereof, or a relatively short battery having positive and negative terminals on a single end surface thereof, said battery receptacle comprising:
   (a) a receptacle housing comprising a base for supporting one end of each battery which is inserted into said receptacle, and at least one sidewall connected to, and extending from, said base; and
   (b) at least one spacer assembly connected to a portion of said housing, each spacer assembly comprising means for receiving at least one relatively long battery which is adapted to be supported by said base and extend through said spacer assembly, and means for contacting one end surface of said relatively short battery when said short battery is inserted into said receptacle, wherein said spacer assembly comprises at least one non-conductive spacer plate having an upper surface and a lower surface, said plate having a thickness (d) determined in accordance with the equation $d = T - (t + B)$, wherein T is the height of each relatively long battery, t is the height of each relatively short battery, and B is the depth of each one of a plurality of battery receiving recesses located in said base.

76. A battery receptacle adapted to selectively receive at least two different types of batteries having different heights, at least one relatively long battery having a positive terminal on a first end face thereof and a negative terminal on a second end face thereof, or a relatively short battery having positive and negative terminals on a single end surface thereof, said battery receptacle comprising:
   (a) a receptacle housing comprising a base for supporting one end of each battery which is inserted into said receptacle, and at least one sidewall connected to, and extending from, said base; and
   (b) at least one spacer assembly connected to a portion of said housing, each spacer assembly comprising means for receiving at least one relatively long battery which is adapted to be supported by said base and extend through said spacer assembly, and means for contacting one end surface of said relatively short battery when said short battery is inserted into said receptacle, wherein said spacer assembly comprises at least one non-conductive spacer plate having an upper surface and a lower surface, said plate having a plurality of openings, at least one generally arcuate tongue being attached to said plate and positioned in at least one of said openings.

77. A battery receptacle adapted to selectively receive at least two different types of batteries having different heights, at least one relatively long battery having a positive terminal on a first end face thereof and a negative terminal on a second end face thereof, or a relatively short battery having positive and negative terminals on a single end surface thereof, said battery receptacle comprising:
   (a) a receptacle housing comprising a base for supporting one end of each battery which is inserted into said receptacle, and at least one sidewall connected to, and extending from, said base; and
   (b) at last one spacer assembly connected to a portion of said housing, each spacer assembly comprising means for receiving at least one relatively long battery which is adapted to be supported by said base and extend through said spacer assembly, and means for contacting one end surface of said relatively short battery when said short battery is inserted into said receptacle, wherein said housing includes a pivotable lid positioned outwardly of said spacer assembly, said spacer assembly and said lid being independently pivotably connected to said housing.

78. A battery receptacle adapted to selectively receive at least two different types of batteries having different heights, at least one relatively long battery having a positive terminal on a first end face thereof and a negative terminal on a second end face thereof, or a relatively short battery having positive and negative terminals on a single end surface thereof, said battery receptacle comprising:
   (a) a receptacle housing comprising a base for supporting one end of each battery which is inserted into said receptacle, and at least one sidewall connected to, and extending from, said base; and
   (b) at least one spacer assembly connected to a portion of said housing, each spacer assembly comprising means for receiving at least one relatively long battery which is adapted to be supported by said base and extend through said spacer assembly, and means for contacting one end surface of said relatively short battery when said short battery is inserted into said receptacle, wherein said spacer assembly is adapted to overlie substantially the entire cross-sectional area of the receptacle housing.

79. A battery receptacle in accordance with claim 15, said spacer assembly including a plurality of electrical contacts which are adapted to contact positive and negative terminals on a single end surface of said relatively short battery when said relatively short battery is inserted into said receptacle housing.

* * * * *

UNITED STATES PATENT AND TRADEMARK OFFICE
CERTIFICATE OF CORRECTION

PATENT NO. : 4,863,812

DATED : September 5, 1989

INVENTOR(S) : Toshiaki Ueda, et al

It is certified that error appears in the above-identified patent and that said Letters Patent is hereby corrected as shown below:

Col. 1, line 25, change "matter" to --manner--.
line 54, change "interchangably" to --interchangeably--.

Col. 2, line 2, change "electrode" to --electrical--.
line 13, change "negaative" to --negative--.

Col. 3, line 25, change "H" to --B--.
Col. 5, line 3, change "east" to --least--.
Col. 6, line 20-21, change "contact electrodes" to --electrical contacts --.
Col. 7, line 60 delete "is"
Col. 8, line 8 change "accomodate" to --accommodate--.
line 21, change "shafts" to --shaft--.
line 23, change "An" to --A--.
line 38, change "with" to --within--.
line 63, change "engaing" to --engaging--.

Col. 9, line 64, change "electrodes" to --electrical contacts--.
Col. 10, line 23, change "whey" to --when--.
line 45, change "31" to --32--.
line 49, after "lid" insert --33--.
line 63, change "26" to --36--.

Col. 21, line 50, after "base" insert --has--.
Col. 22, line 8, change "47" to --45--.
Col. 23, line 29, change "last" to --least--.
line 54-55, change "receiver at last" to --receive at least--.
line 66, change "last" to --least--.

UNITED STATES PATENT AND TRADEMARK OFFICE
CERTIFICATE OF CORRECTION

PATENT NO. : 4,863,812

DATED : September 5, 1989

INVENTOR(S) : Toshiaki Ueda, et al

It is certified that error appears in the above-identified patent and that said Letters Patent is hereby corrected as shown below:

Col. 25, line 15, change "last" to --least--.

Signed and Sealed this

Eighteenth Day of May, 1993

Attest:

MICHAEL K. KIRK

*Attesting Officer*      *Acting Commissioner of Patents and Trademarks*